(12) United States Patent
Hu et al.

(10) Patent No.: US 10,747,674 B2
(45) Date of Patent: Aug. 18, 2020

(54) CACHE MANAGEMENT SYSTEM AND METHOD

(71) Applicant: EMC IP Holding Company, LLC, Hopkinton, MA (US)

(72) Inventors: Wilson Hu, Beijing (CN); Qiaosheng Zhou, Beijing (CN); Shuo Lv, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 5 days.

(21) Appl. No.: 16/034,657

(22) Filed: Jul. 13, 2018

(65) Prior Publication Data

US 2019/0034345 A1 Jan. 31, 2019

(30) Foreign Application Priority Data

Jul. 31, 2017 (CN) .......................... 2017 1 0638037

(51) Int. Cl.
*G06F 12/0884* (2016.01)
*G06F 12/0893* (2016.01)
(Continued)

(52) U.S. Cl.
CPC ...... *G06F 12/0884* (2013.01); *G06F 12/0844* (2013.01); *G06F 12/0891* (2013.01); *G06F 12/0893* (2013.01); *G06F 12/0895* (2013.01); *G06F 2212/1032* (2013.01); *G06F 2212/601* (2013.01)

(58) Field of Classification Search
CPC .............. G06F 3/00; G06F 3/06–0689; G06F 5/00–16; G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902;
(Continued)

(56) References Cited

U.S. PATENT DOCUMENTS 3,573,744 A * 4/1971 Rigazio ................. G06F 3/0601
711/117
5,448,719 A * 9/1995 Schultz ............... G06F 12/0866
711/141

(Continued)

OTHER PUBLICATIONS

F. Hayakawa, H. Okano and A. Suga, "An 8-way VLIW embedded multimedia processor with advanced cache mechanism," Proceedings. IEEE Asia-Pacific Conference on ASIC,, Taipei, Taiwan, 2002, pp. 213-216. (Year: 2002).*

(Continued)

*Primary Examiner* — Daniel C. Chappell
(74) *Attorney, Agent, or Firm* — Brian J. Colandreo; Mark H. Whittenberger; Holland & Knight LLP

(57) ABSTRACT

A method, computer program product, and computing system for identifying, at the computing device, one or more cache pages in a cache system. One or more cache pages may be refactored into one or more cache units within the one or more cache pages. A plurality of parallel IO requests may be executed on the one or more cache units within the one or more cache pages.

14 Claims, 6 Drawing Sheets

(51) Int. Cl.
 *G06F 12/0891* (2016.01)
 *G06F 12/0844* (2016.01)
 *G06F 12/0895* (2016.01)

(58) Field of Classification Search
 CPC .... G06F 2212/00–7211; G06F 2213/00–4004; G06F 2216/00–17; G06F 2221/00–2153
 See application file for complete search history.

(56) References Cited

U.S. PATENT DOCUMENTS

| | | | | |
|---|---|---|---|---|
| 5,721,954 | A * | 2/1998 | Shrock | G06F 13/387 710/24 |
| 5,819,117 | A * | 10/1998 | Hansen | G06F 7/768 712/300 |
| 6,130,759 | A * | 10/2000 | Blair | G06F 12/023 358/1.15 |
| 7,401,204 | B1 * | 7/2008 | Miyake | G06F 9/3802 712/208 |
| 9,201,804 | B1 * | 12/2015 | Egyed | G06F 12/0893 |
| 2004/0028053 | A1 * | 2/2004 | Mes | G06F 13/30 370/395.7 |
| 2004/0054877 | A1 * | 3/2004 | Macy, Jr. | G06F 7/76 712/221 |
| 2008/0313441 | A1 * | 12/2008 | Gustavson | G06F 12/0875 712/225 |
| 2012/0117322 | A1 * | 5/2012 | Satran | G06F 3/0625 711/114 |
| 2014/0164703 | A1 * | 6/2014 | Kuesel | G06F 12/0802 711/122 |

OTHER PUBLICATIONS

Zahra Ronaghi et al. 2017. Python in the NERSC Exascale Science Applications Program for Data. In Proceedings of the 7th Workshop on Python for High-Performance and Scientific Computing, Article 1 (Year: 2017).*

* cited by examiner

CACHE MANAGEMENT SYSTEM AND METHOD

RELATED CASES

The subject application claims the priority of China Patent Application No. 201710638037.0, filed on 31 Jul. 2017, the contents of which are herein incorporated by reference in its entirety.

BACKGROUND

Storing and safeguarding electronic content may be beneficial in modern business and elsewhere. Accordingly, large data storage systems may be utilized to protect such electronic content, wherein such large data storage systems may be configured as data storage arrays to provide a high level of data availability. Such large data storage systems may utilize cache memory systems to expedite the storage/retrieval of data within/from these data storage arrays by multiple hosts through various IO requests.

SUMMARY OF DISCLOSURE

In one example implementation, a computer-implemented method executed on a computing device may include but is not limited to identifying, at the computing device, one or more cache pages in a cache system. One or more cache pages may be refactored into one or more cache units within the one or more cache pages. A plurality of parallel IO requests may be executed on the one or more cache units within the one or more cache pages.

One or more of the following example features may be included. Refactoring the one or more cache pages may be based upon, at least in part, an alignment pattern of the plurality of parallel IO requests and a length of the one or more cache pages. Executing the plurality of parallel IO requests may include locking at least one cache unit of the one or more cache units within the one or more cache pages during execution of the plurality of parallel IO requests on the at least one cache unit. Refactoring the one or more cache pages may include generating one or more bitmaps for the one or cache pages. The one or more bits in the one or more bitmaps may represent the one or more cache units within the one or more cache pages. The one or more bits in the one or more bitmaps may indicate which cache units within the one or more cache pages are valid. The one or more bits in the one or more bitmaps may indicate which cache units within the one or more cache pages are dirty. One or more dirty cache units of the one or more cache units within the one of more cache pages may be flushed based upon, at least in part, the one or more bits in the one or more bitmaps which indicate which cache units within the one or more cache pages are dirty.

In another example implementation, a computer program product resides on a computer readable medium that has a plurality of instructions stored on it. When executed by a processor, the instructions cause the processor to perform operations that may include but are not limited to identifying, at the computing device, one or more cache pages in a cache system. One or more cache pages may be refactored into one or more cache units within the one or more cache pages. A plurality of parallel IO requests may be executed on the one or more cache units within the one or more cache pages.

One or more of the following example features may be included. Refactoring the one or more cache pages may be based upon, at least in part, an alignment pattern of the plurality of parallel IO requests and a length of the one or more cache pages. Executing the plurality of parallel IO requests may include locking at least one cache unit of the one or more cache units within the one or more cache pages during execution of the plurality of parallel IO requests on the at least one cache unit. Refactoring the one or more cache pages may include generating one or more bitmaps for the one or cache pages. The one or more bits in the one or more bitmaps may represent the one or more cache units within the one or more cache pages. The one or more bits in the one or more bitmaps may indicate which cache units within the one or more cache pages are valid. The one or more bits in the one or more bitmaps may indicate which cache units within the one or more cache pages are dirty. One or more dirty cache units of the one or more cache units within the one of more cache pages may be flushed based upon, at least in part, the one or more bits in the one or more bitmaps which indicate which cache units within the one or more cache pages are dirty.

In another example implementation, a computing system includes at least one processor and at least one memory architecture coupled with the at least one processor, wherein the computing system is configured to perform operations that may include but are not limited to identifying, at the computing device, one or more cache pages in a cache system. One or more cache pages may be refactored into one or more cache units within the one or more cache pages. A plurality of parallel IO requests may be executed on the one or more cache units within the one or more cache pages.

One or more of the following example features may be included. Refactoring the one or more cache pages may be based upon, at least in part, an alignment pattern of the plurality of parallel IO requests and a length of the one or more cache pages. Executing the plurality of parallel IO requests may include locking at least one cache unit of the one or more cache units within the one or more cache pages during execution of the plurality of parallel IO requests on the at least one cache unit. Refactoring the one or more cache pages may include generating one or more bitmaps for the one or cache pages. The one or more bits in the one or more bitmaps may represent the one or more cache units within the one or more cache pages. The one or more bits in the one or more bitmaps may indicate which cache units within the one or more cache pages are valid. The one or more bits in the one or more bitmaps may indicate which cache units within the one or more cache pages are dirty. One or more dirty cache units of the one or more cache units within the one of more cache pages may be flushed based upon, at least in part, the one or more bits in the one or more bitmaps which indicate which cache units within the one or more cache pages are dirty.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
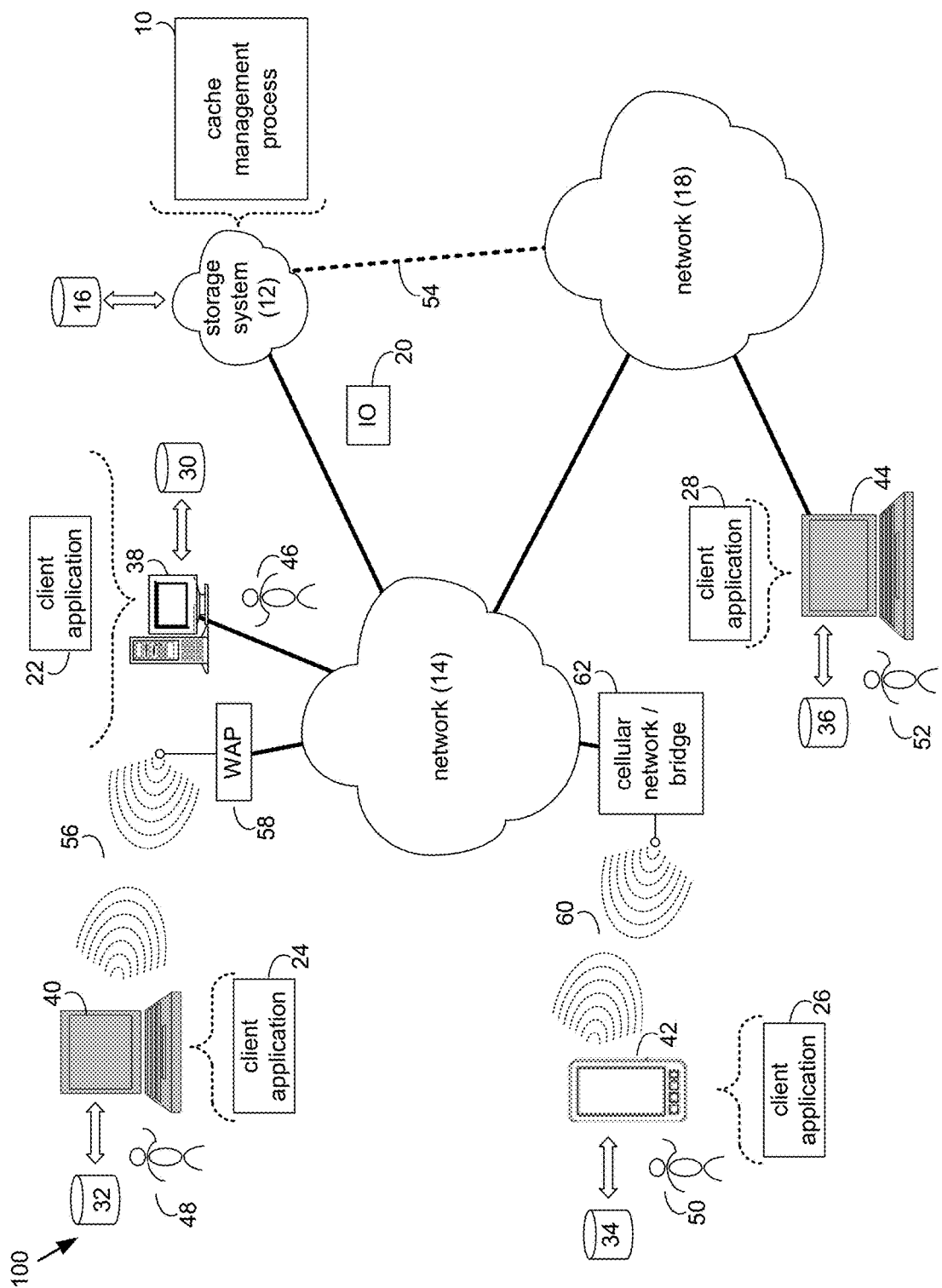
FIG. 1 is an example diagrammatic view of a storage system and a cache management process coupled to a distributed computing network according to one or more example implementations of the disclosure.

System Overview:

Referring to FIG. 1, there is shown cache management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of cache management process 10, which may be stored on storage device 16 included within storage system 12, may be executed by one or more processors and one or more memory architectures included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of cache management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors and one or more memory architectures incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server, a data-enabled, cellular telephone, and a dedicated network device.

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a cache management process, such as cache management process 10 of FIG. 1, may include but is not limited to, identifying one or more cache pages in a cache system. One or more cache pages may be refactored into one or more cache units within the one or more cache pages. A plurality of parallel IO requests may be executed on the one or more cache units within the one or more cache pages.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
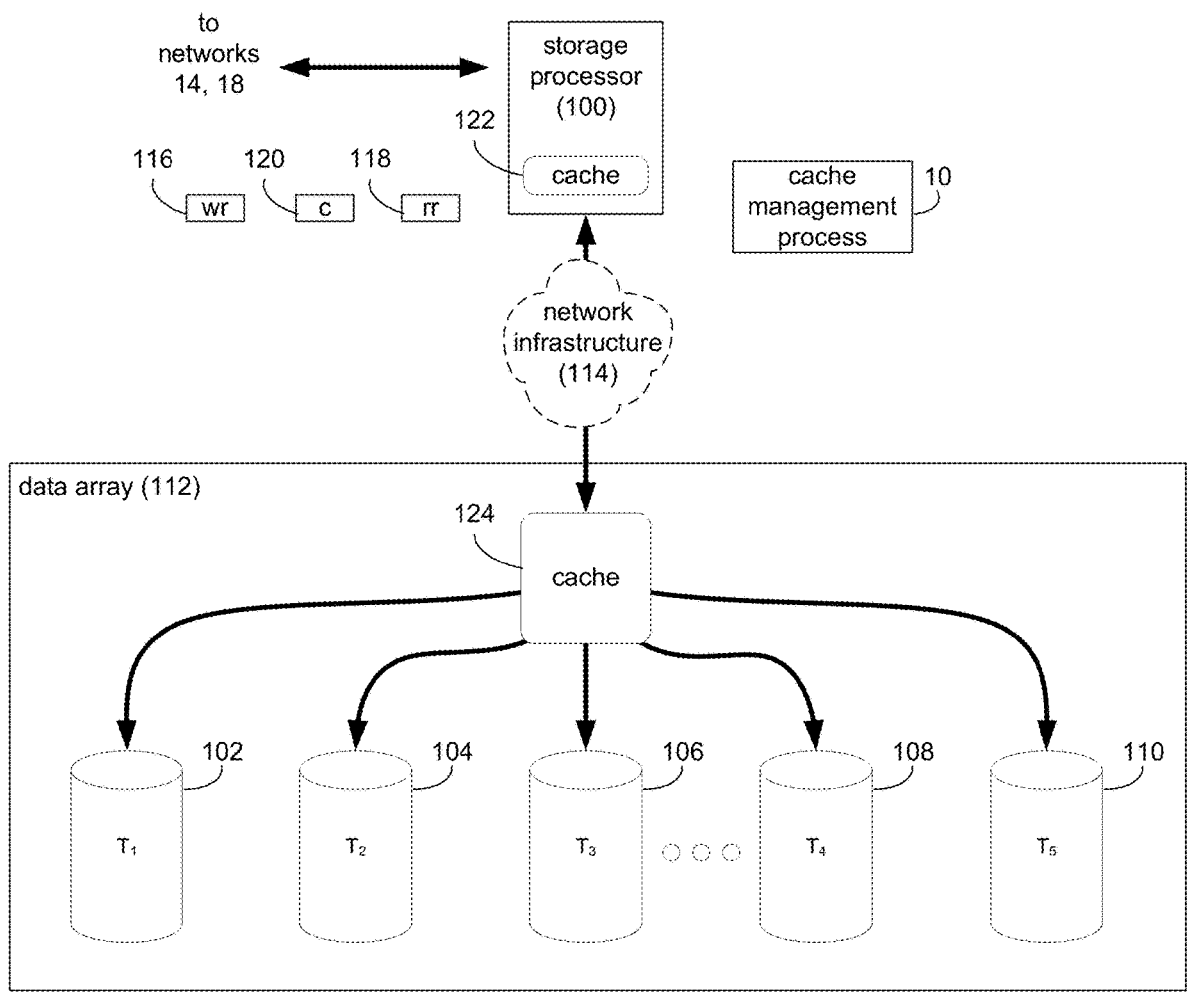
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of cache management process 10. The instruction sets and subroutines of cache management process 10, which may be stored on a storage device (e.g., storage device 16) coupled to storage processor 100, may be executed by one or more processors and one or more memory architectures included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of cache management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of cache management process 10, which may be stored on storage device 16 included within storage system 12, may be executed by one or more processors and one or more memory architectures included within storage system 12. Accordingly, in addition to being executed on storage processor 100, some or all of the instruction sets and subroutines of cache management process 10 may be executed by one or more processors and one or more memory architectures included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
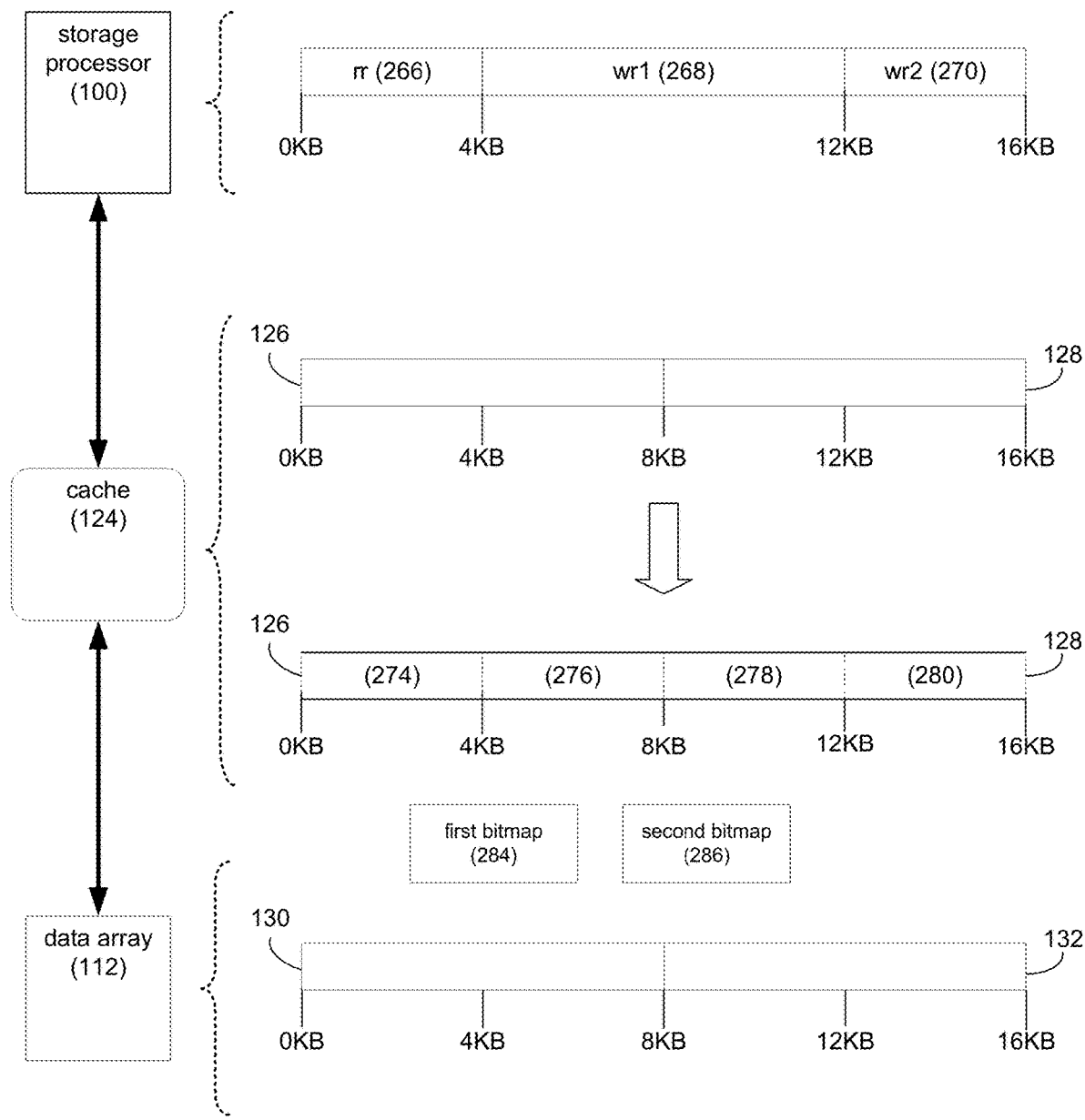
FIG. 3 is another example diagrammatic view of the storage system of FIG. 1 according to one or more example implementations of the disclosure.

The Cache Pages:

Referring also to FIG. 3, there is shown another example implementation of storage system 12 that includes storage processors 100, backend cache memory system 124 and data array 112. For example purposes only, backend cache memory system 124 is shown to include two cache pages (e.g., cache pages 126, 128) and data array 112 is shown to include two file system blocks (e.g., file system blocks 130, 132). In some implementations, a cache page or buffer page may represent a unit of storage within backend cache memory system (e.g., backend cache memory system 124) for temporarily storing data. In the example of FIG. 3, a cache page may have a predetermined length (e.g. 8 KB). In some implementations, this length may be pre-defined or may be set by storage management process 10 and/or a storage administrator. A file system block (e.g., file system blocks 130, 132) may represent a unit of storage in a storage target of a data array for storing data. However, the file system block may represent any unit of storage in a storage target of a data array. In some implementations, the size or length of the cache page may be based upon the size or length of the file system block.

As will discussed in greater detail below, the one or more cache pages (e.g., cache pages 126, 128) in the backend cache memory system (e.g., backend cache memory system 124) may be associated with memory locations and/or file system blocks (e.g., file system blocks 130, 132) in a data array (e.g., data array 112). Accordingly, a cache page may be "clean" when the cache page includes a copy of data that has been synchronized to the memory locations and/or file system blocks in the data array. A cache page may be "dirty" when the cache page is valid (as will be discussed below) and includes the most recent copy of the data, but has not been synchronized with the one or more memory locations and/or file system blocks in the data array. A cache page may be "valid" when the cache page includes a representation of data that resides in the one or more memory locations and/or file system blocks in the data array. A cache page may be "invalid" when the cache page does not include any usable data and/or contains data that does not represent data in a memory location or file system block of the data array. As will be discussed in greater detail below, implementations of cache management process 10 may apply the above descriptions of a cache page to the entire cache page and/or portions of the cache page.

Figure 4:
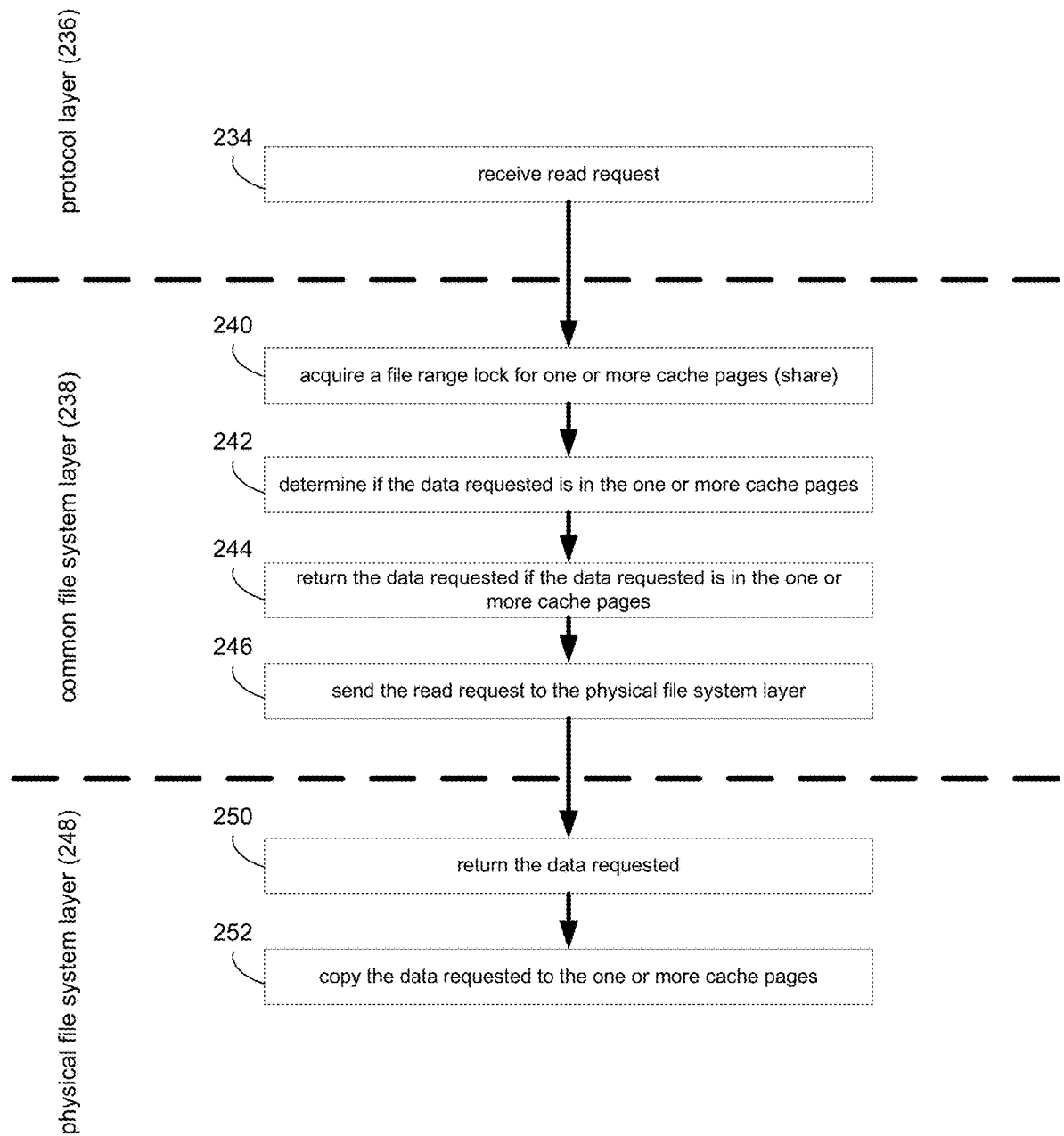
FIGS. 4-5 are example workflows of various implementations of cache management process of FIG. 1 according to one or more example implementations of the disclosure.

Referring also to FIG. 4, there is shown workflow 400 for a read request received by and/or processed by storage system 12. In some implementations, a read request may be received 234 at a protocol layer (e.g., protocol layer 236). A protocol layer, as used herein, may include, but is not limited to a network file system (NFS), a common internet file system (CIFS), or any other distributed file system between a plurality of computing devices. In some implementations, the read request may be processed at a common file system layer (e.g., common file system layer 238). In the common file system layer, cache management process 10 may acquire 240 a file range lock for one or more cache pages (e.g., cache pages 126, 128) in the cache memory system (e.g., backend cache memory system 124). In some implementations, the lock may prevent the data in the one or more locked cache pages from being overwritten while the data may be shared for reading. In some implementations, the length, size, or granularity per file range lock may be based upon the length, size, or granularity of the cache page. In one example, if the cache page size is 8 KB, acquiring a file range lock may lock 8 KB per file range lock. While an example of 8 KB has been discussed, it will be appreciated that other cache page sizes may be used within the scope of the present disclosure.

In some implementations, cache management process 10 may determine 242 if the data requested in the read request is in the cache. If cache management process 10 determines that the data requested by the read request is in the cache (i.e. a cache hit), cache management process 10 may return 244 the data requested. If cache management process 10 determines that the data requested by the read request is not in the cache (e.g., a cache miss), cache management process 10 may send 246 the read request to a physical file system layer (e.g., physical file system layer 248). A physical file system layer may generally include, but is not limited to, a Universal Extended File System (UxFS) or other file system that may be configured to manage the physical operation of the data array. In some implementations, the physical file system layer may process physical blocks being read or written. In some implementations, the physical file system layer may handle buffering and memory management and may be responsible for the physical placement of blocks in specific locations in the data array. In some implementations, storage management process 10 may return 250 the data requested from the physical file system layer and may copy 252 the data requested by the read request into the cache.

Figure 5:
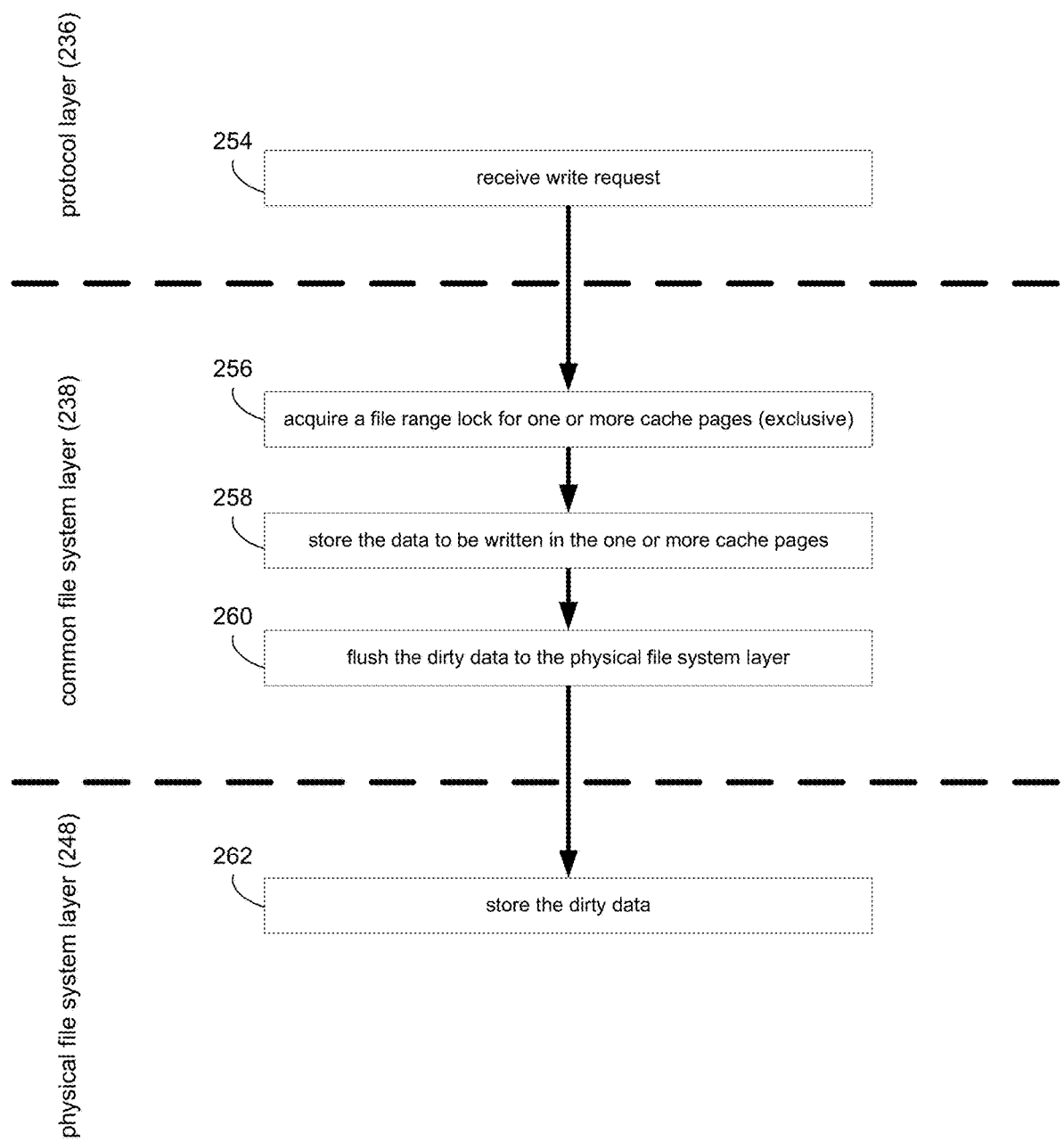
Figure 6:
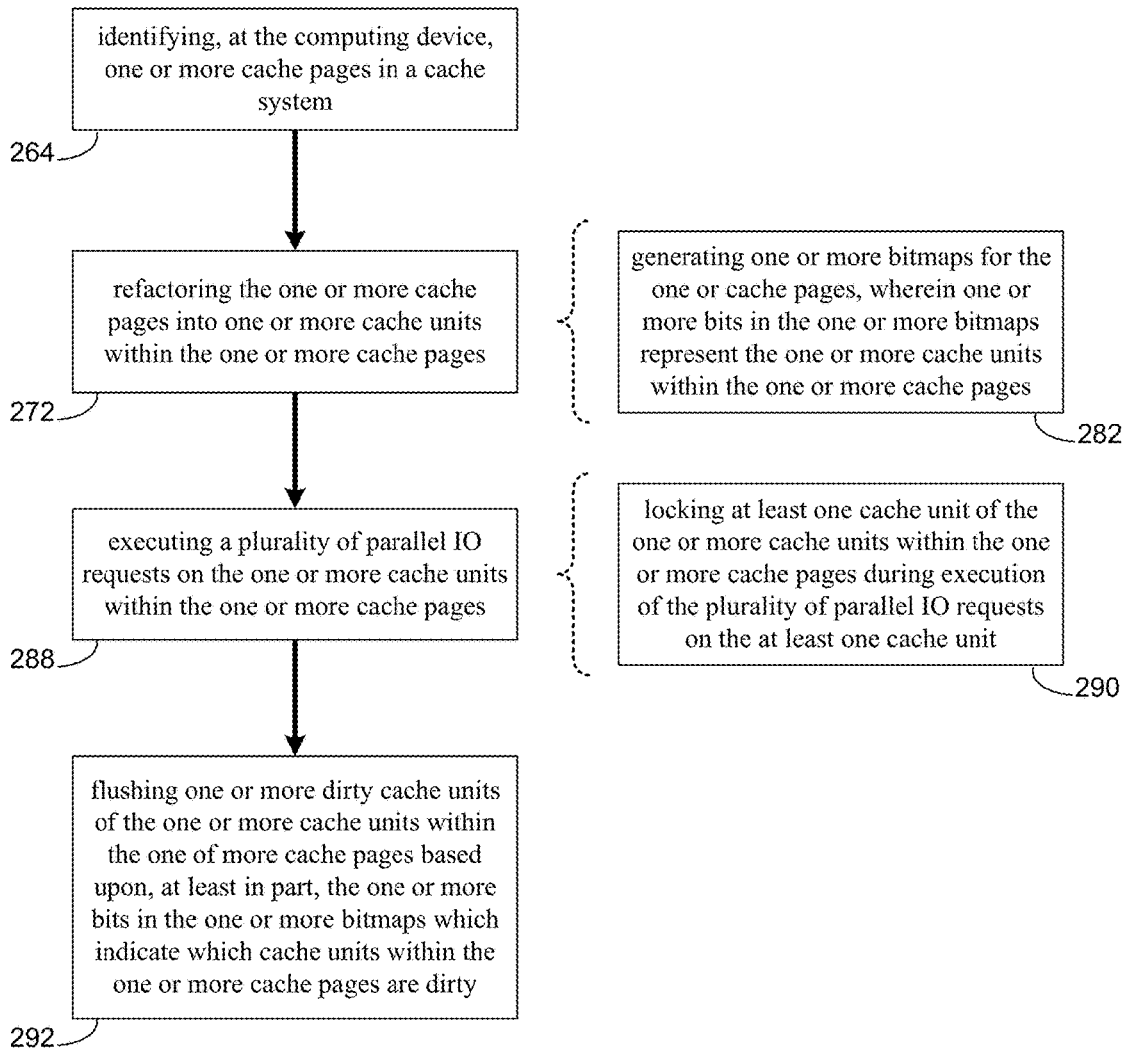
FIG. 6 is an example flowchart of the cache management process of FIG. 1 according to one or more example implementations of the disclosure.

Referring also to FIG. 5, there is shown a workflow 500 for a write request received by and/or processed by storage system 12. In some implementations, a write request may be received 254 at a protocol layer (e.g., protocol layer 236). In some implementations, the write request may be processed at the common file system layer (e.g., common file system layer 238). In the common file system layer, cache management process 10 may acquire 256 a file range lock for one or more cache pages. In some implementations, the file range lock may be exclusive such that the one or more locked cache pages may be locked from reading or writing data. As discussed above, the granularity per file range lock may be based upon the size or granularity of the cache page. In some implementations, cache management process 10 may store 258 the data to be written in the one or more locked cache pages and return. In some implementations, cache management process 10 may flush 260 the stored data (e.g., "dirty" data) from the one or more locked cache pages to the physical file system layer (e.g., physical file system layer 248). In some implementations, flushing the stored data may wait on one or more overlapped commit lists. In some implementations, the data to be flushed may be included in a dirty data list. In some implementations, the granularity of the background flush overlap check may be based upon the size or granularity of the cache page. Accordingly, cache management process 10 may flush data per cache page. In some implementations, the physical file system layer may store 262 the dirty data/data to be written in the storage array.

In some implementations, an IO request may be aligned with a specific length or size. For example, "2 KB aligned" may generally mean that both the start offset and length of the IO request are 2 KB aligned, for example, a read request for 4 KB at offset 2 KB, a write request of 2 KB at offset 8 KB, a write request of 100 KB at offset 0 KB, etc. may all be 2 KB aligned where the offset and the length is a multiple of 2 KB. It will be appreciated that other lengths may be used without departing from the scope of the disclosure. As will be discussed in greater detail below, an IO request may be "sector aligned" when both the offset and length of the IO request are a multiple of 512 bytes or 512 B, such as a read request for 512 bytes at offset 1 KB, a write request of 4 KB at offset 1536 bytes, etc.

In some implementations, a plurality of IO requests and/or parallel IO requests may be misaligned or may not be aligned with one or more cache pages. "Parallel IO requests" may generally include, but are not limited to, the performance of multiple IO requests at the same time, concurrently, and/or nearly concurrently. For discussion purposes, the terms "parallel IO requests" and "IO requests" may be used interchangeably.

In the example of FIG. 3, cache management process 10 may receive a read request (e.g., rr 266) and two write requests (e.g., wr1 268, wr2 270) sent to same file in parallel (e.g., 0 KB to 16 KB of file system blocks 130, 132). The read request may include a request to read the first 4 KB of the file (e.g., 0 KB to 4 KB of file system block 130). The first write request (e.g., wr1 268) may include a request to modify 8 KB from offset 4 KB of the same file, while the second write request (e.g., wr2 270) may include a request to modify 4 KB from offset 12 KB of the file. In some implementations, and as discussed above in the processing of read and write requests, suppose read request (e.g., rr 266) acquires the file range lock first followed by the first write request (e.g., wr1 268) and then the second write request (e.g., wr2 270). In this example, there may be several example areas where I/O performance may be impacted.

For example, the plurality of parallel IO requests may encounter range lock contention. Generally, "range lock contention" may include the locking of one or more cache pages associated with a plurality of parallel IO requests. During this range lock contention, the file range lock of the one or more cache pages (e.g., cache pages 126, 128) for each request may force these requests to be executed sequentially or serially.

Additionally, the plurality of parallel IO requests may encounter a "read-before-cache & return" due to partial block write. In the example of FIG. 3, regardless of whether the first write request (e.g., wr1 268) or the second write request (e.g., wr2 270) runs or executes first, when a cache page targeted by the write request for modifying is not yet in the cache memory system, the missing part of the cache page may be read first. For example, when wr2 270 runs or executes first, the heading 4 KB of the 2nd 8 KB block, or whole 8 KB block, may be read from a physical file system or data array and the new content of the 2nd 4 KB of this 8 KB block may be placed into the cache memory system. Later, the whole 8 KB block may be flushed (typically in background) to the physical file system or data array. At least because of the extra read operation, the write performance may be impacted.

In addition, the plurality of parallel IO requests may encounter background flush contention. For example, suppose the second write request (e.g., wr2 270) modified the 2nd 8 KB in file cache and returns, and then a background flush may be triggered before the first write request (e.g., wr1 268) goes to modify the same 8 KB cache page. In this case, the first write request (e.g., wr1 268) may clone a new 8 KB cache page for the 2nd 8 KB fs block. When the first write request (e.g., wr1 268) flushes the same 8 KB block (usually in a new background flush thread), the flush may have to wait for a former commit list (corresponding to the second write request (e.g., wr2 270)) to finish first.

The Cache Management Process:

As discussed above, and also referring to the example implementation of FIGS. 3-6, cache management process 10 may identify 264 one or more cache pages in a cache system. Cache management process 10 may refactor 272 the one or more cache pages into one or more cache units within the one or more cache pages. Cache management process 10 may execute 288 a plurality of parallel IO requests on the one or more cache units within the one or more cache pages.

As discussed above, cache management process 10 may receive a plurality of parallel IO requests. As discussed above, and in the example of FIG. 3, cache management process 10 may receive a read request (e.g., rr 266) and two write requests (e.g., wr1 268, wr2 270) sent to same file in parallel (e.g., 0 KB to 16 KB of file system blocks 130, 132). The read request may include a request to read the first 4 KB of the file (e.g., 0 KB to 4 KB of file system block 130). The first write request (e.g., wr1 268) may include a request to modify 8 KB from offset 4 KB of the same file, while the second write request (e.g., wr2 270) may include a request to modify 4 KB from offset 12 KB of the file. Read requests (e.g., rr 266) and write requests (e.g., wr1 268, wr2 270) may include an address, a pointer, or other identifier to one or more file system block (e.g., file system blocks 130, 132). In some implementations, read requests (e.g., rr 266) and write requests (e.g., wr1 268, wr2 270) may include an address, a pointer, or other identifier to one or more cache pages (e.g., cache pages 126, 128) associated with the one or more file system blocks (e.g., file system blocks 130, 132) in the backend cache memory system (e.g., backend cache memory system 124).

For example, cache management process 10 may identify 264 one or more file system blocks (e.g., file system blocks 130, 132) in a data array (e.g., data array 112). Additionally, cache management process 10 may identify one or more cache pages (e.g., cache pages 126, 128) associated with the one or more file system blocks (e.g., file system blocks 130, 132) in the backend cache memory system (e.g., backend cache memory system 124) targeted by the plurality of parallel IO requests (e.g., rr 266, wr1 268, and wr2 270).

In some implementations, cache management process 10 may refactor 272 the one or more cache pages into one or more cache units within the one or more cache pages. "Refactoring" may generally include, but is not limited to, modifying the one or more cache pages to include a configurable length, size, or granularity without restructuring the pre-defined cache page length or size. For example, and as discussed above, the one or more cache pages and the plurality of parallel IO requests may not be aligned. In one example, the one or more cache pages (e.g., cache pages 126, 128) may be 8 KB aligned. As shown in the example of FIG. 3, a plurality of IO requests may be received that are not 8 KB aligned (e.g., wr1 268 is not 8 KB aligned). Cache management process 10 may refactor 272 the one or more cache pages (e.g., cache pages 126, 128) into one or more cache units (e.g., cache units 274, 276, 278, 280). A cache unit may represent at least a portion of a cache page. As will be discussed in greater detail below, cache management process 10 may utilize the one or more cache units within the one or more cache pages to execute a plurality of aligned and non-aligned parallel IO requests.

In some implementations, refactoring 272 the one or more cache pages may be based upon, at least in part, an alignment pattern of the plurality of parallel IO requests and a length of the one or more cache pages. Continuing with the above example, cache management process 10 may determine an alignment pattern for a plurality of IO requests. In some implementations, the alignment pattern may be specific to a particular client application. In some implementations, cache management process 10 may be sector aligned, where a sector is 512 bytes. For example, many network attached storage (NAS) applications, virtual disks in a cloud computing environment, database raw files, etc. may be sector aligned. In some implementations, the cache unit may match the alignment size of an underlying disk I/O of a storage target (e.g., storage target 102) within a data array (e.g., data array 112).

In some implementations, cache management process 10 may refactor the one or more cache pages into one or more cache units of $2^N$ sectors, where "N" may be an integer. In one embodiment, each cache unit may include 512 bytes and N may be an integer from 0-4 (e.g., 0, 1, 2, 3, or 4). When N is 0, the length, size, and/or granularity of the one or more cache pages may be 512 bytes (e.g., 512 B) and when N is 4, the cache length, size, and/or granularity may be eight kilobytes (e.g., 8 KB). In some implementations, N may be configured as a fixed value during each boot cycle, e.g., a change of N may require a system reboot. In some implementations, N may be a server global parameter, which may be based upon, at least in part, a typical workload or alignment pattern associated with the plurality of IO requests sent to storage system 12. For example, if most IO requests are 2 KB aligned, cache management process 10 may set N=2 or smaller, where N=2 may be ideal. However, it will be appreciated that other cache unit sizes and values of N are within the scope of the present disclosure.

Returning to the example implementation of FIG. 3, cache management process 10 may refactor 272 the one or more cache pages into one or more cache units based upon, at least in part, the alignment pattern (e.g., 4 KB) of the plurality of parallel IO requests (e.g., rr 266, wr1 268, and wr2 270) and the length or size (e.g., 8 KB) of the one or more cache pages (e.g., 126, 128). In this example, cache management process 10 may set N=3 for a cache unit size of 4 KB.

In some implementations, refactoring the one or more cache pages may include generating 282 one or more bitmaps for the one or more cache pages. In some implementations, the one or more bits in the one or more bitmaps may represent the one or more cache units within the one or more cache pages. In some implementations, assume for example purposes that the cache page size is 8 KB. In some implementations, the one or more bitmaps may include a 16 bit value where each bit may represent a cache unit (e.g., 512 B) of the cache page (e.g., 8 KB). For example, when N=0, a cache unit may be a sector (e.g., 512 B) and all 16 bits may be used. In another example, when N=4 and the cache page is 8 KB, the bitmap may not be used as the plurality of parallel IO requests are aligned with the one or more cache pages. While specific examples of the number of bits have been provided, it will be appreciated that other numbers of bits may be used to represent one or more of the one or more cache units in the one or more cache pages.

In some implementations, the number of bits in the one or more bitmaps may be based upon, at least in part, the cache unit length or size (e.g., value of N). For example purposes only assume that the cache page size is 8 KB, when N>0 and/or N<4, a subset of the one or more bits of the bitmap may be used. In one example, two bits (e.g., bit 0 and bit 1) may be used when N=3 (e.g., cache unit size of 4 KB). In another example, four bits (e.g., bit 0, bit 1, bit 2, and bit 3) may be used when N=2 (e.g., cache unit size of 2 KB). In another example, eight bits (e.g., bit 0, bit 1, bit 2, bit 3, bit 4, bit 5, bit 6, and bit 7) may be used when N=1 (e.g., cache unit size of 1 KB). In some implementations, when N=0, all 16 bits may be used. When N=4, the cache unit may be a whole 8 KB cache page and the bitmap may not be used at all. While specific examples of bits have been provided for various cache unit sizes, other numbers and/or combination of bits may be used within the scope of the present disclosure.

In some implementations, the one or more bits in the one or more bitmaps may indicate which cache units within the one or more cache pages are valid. In some implementations, a first bitmap 284 of the one or more bitmaps may be generated to indicate which cache units within the cache page are valid. In some implementations, generating the first bitmap (e.g., first bitmap 284) may include adding the "ushort bitmap" member provided below into a new file cache entry object definition, such as, e.g.:

```
class fileCacheEntry {
    struct Buffer_Cached *blockPtr;// pointer to buffer page
    int generation;// generation of the buffer page
    ushort bitmap;// each bit may represent a cache unit, where a value of "1"
    may indicate that the cache unit is valid if the buffer page is valid. };
```

Returning to the example implementation of FIG. 3, assume for example purposes only that the state of the validity of the one or more cache units (e.g., cache units 274, 276, 278, 280) in the one or more cache pages (e.g., cache pages 126, 128) prior to executing the plurality of parallel IO requests is as follows:

Cache Unit 1 274 (0 KB-4 KB): valid
Cache Unit 2 276 (4 KB-8 KB): invalid
Cache Unit 3 278 (8 KB-12 KB): valid
Cache Unit 4 280 (12 KB-16 KB): valid In some implementations, cache management process 10 may generate 282 a first bitmap (e.g., first bitmap 284) with one or more bits to indicate which of the one or more cache units (e.g., cache units 274, 276, 278, 280) are valid. In some implementations where N=3, two bits may be used to indicate which cache units of the one or more cache pages are valid. For example, the first bitmap may be generated for cache page 126 with bit 0=1 and bit 1=0 to represent that cache unit 274 is valid and that cache unit 276 is invalid. The first bitmap may be generated for the cache page 128 with bit 0=1 and bit 1=1 to represent that both cache units 278, 280 are valid.

In some implementations, the one or more bits in the one or more bitmaps may indicate which cache units within the one or more cache pages are dirty. In some implementations, a second bitmap 286 of the one or more bitmaps may be generated for the one or more cache pages to indicate which cache units within the cache page are dirty. Additionally, cache management process 10 may make the physical file system layer (e.g., physical file system layer 236) aware of the cache unit for flushing the one or more cache units within the one or more cache pages. In some implementations, cache management process 10 may refactor one or more commit list entries sent down from the common file system layer (e.g., common file system layer 238). In some implementations, the one or more entries of a commit list may represent one or more file system blocks (e.g., file system blocks 130, 132) to flush data to within the storage array (e.g., data array 112). In some implementations, the one or more entries in the commit list may include a reference or pointer to one or more cache pages (e.g., cache pages 126, 128) from which to flush data into the one or more file system block (e.g., file system blocks 130, 132). Cache management process 10 may refactor the one or more commit list entries to represent the one or more cache units (e.g., cache units 274, 276, 278, 280) within in a cache page (e.g., cache pages 126, 128) associated with the file system block (e.g., file system blocks 130, 132) for flushing. For example, the second bitmap (e.g., second bitmap 286) may be included to indicate which cache units within the cache page are dirty and need to be flushed by adding the "ushort bitmap" member provided below into a commit list entry, e.g.:

```
class BlockChain {
    BlockChain*   next; // the next entry in the list
    BlockChain*   prev; // the previous entry in the list
    Buffer_Cached *Buf; // buffer page to write to block
    BlockIndex64_t bi; // index of block
    ushort bitmap; // each bit may represent a cache unit where a value of "1"
may indicate that the cache unit is dirty.    };
```

Returning to the example implementation of FIG. 3, assume for example purposes only that determination of which cache units of the one or more cache units (e.g., cache units 274, 276, 278, 280) in the one or more cache pages (e.g., cache pages 126, 128) are dirty is as follows, e.g.:
Cache Unit 1 274 (0 KB-4 KB): dirty
Cache Unit 2 276 (4 KB-8 KB): N/A (e.g., invalid)
Cache Unit 3 278 (8 KB-12 KB): clean
Cache Unit 4 280 (12 KB-16 KB): dirty
In this example, cache management process 10 may generate a second bitmap (e.g., second bitmap 286) with one or more bits to indicate which of the one or more cache units (e.g., cache units 274, 276, 278, 280) are dirty. In this example where N=3, two bits may be used to indicate which cache units of the one or more cache pages are dirty. For example, the second bitmap may be generated for cache page 126 with bit 0=1 and bit 1=0 to represent that cache unit 274 is dirty and that cache unit 276 is clean (e.g., as cache unit 276 is invalid). The second bitmap may be generated for cache page 128 with bit 0=0 and bit 1=1 to represent that cache unit 278 is clean and that cache unit 280 is dirty.

In some implementations, cache management process 10 may execute 288 a plurality of parallel IO requests on the one or more cache units within the one or more cache pages. Returning to the example of FIG. 3 where storage system 12 has received the plurality of parallel IO requests (e.g., rr 266, wr1 268, and wr2 270). Instead of executing one or more of the plurality of parallel IO requests serially, cache management process 10 may execute the plurality of parallel IO requests in parallel. For example, by refactoring 272 the one or more cache pages into the one or more cache units, cache management process 10 may execute the plurality of parallel IO requests because cache management process 10 may lock and flush individual cache units within the one or more cache pages instead of locking and flushing entire cache pages.

For example, executing the plurality of parallel IO requests may include locking 290 at least one cache unit of the one or more cache units within the one or more cache pages during execution of the plurality of parallel IO requests on the at least one cache unit. As discussed above, because the cache memory system (e.g., cache memory system 124) may adopt a granularity smaller than the granularity of the cache pages (e.g., via the refactoring of the one or more cache pages), cache management process 10 may use the granularity of the one or more cache units for the granularity of the file range lock. Returning to the example of FIG. 3, cache management process 10 may execute the read request (e.g., rr 266) and the write requests in parallel (e.g., wr1 268, wr2 270) because cache management process 10 may lock each cache unit as opposed to locking the entire cache page. Accordingly, executing the read request may include locking cache unit 274 during execution of the read request. Additionally, executing the first write request (e.g., wr1 268) may include locking cache unit 276 of cache page 126 and cache unit 278 of cache page 128. Further, executing the second write request may include locking cache unit 280 of cache page 128.

Additionally, cache management process 10 may use the one or more bitmaps to indicate which cache units of the cache page are valid. For example, instead of locking the entire cache page to determine if the cache unit is valid, cache management process 10 may use the first bitmap (e.g., first bitmap 284) to determine which cache units within the cache page are valid.

In some implementations, cache management process 10 may flush 292 the one or more dirty cache units of the one or more cache units within the one of more cache pages based upon, at least in part, the one or more bits in the one or more bitmaps which may indicate which cache units within the one or more cache pages are dirty. Instead of flushing the entire cache page, cache management process 10 may use the second bitmap (e.g., second bitmap 286) to determine which cache units within the one or more cache pages (e.g., cache pages 126, 128) to flush to the data array (e.g., data array 112). Accordingly, the physical file system layer may use the second bitmap (e.g., second bitmap 286) and flush those cache units marked dirty, instead of an entire cache page.

Returning to the example implementation of FIG. 3, upon completion of the execution of the read request and the two write requests, cache management process 10 may flush the one or more dirty cache units within cache pages 126, 128 to one or more file system blocks (e.g., file system blocks 130, 132) of the data array (e.g., data array 112). For example purposes only, assume after executing the read request and the two write requests, the state of the cache unit is as follows (e.g., based upon the first and second bitmaps (e.g., first bitmap 284 and second bitmap 286):

Cache Unit 1 274 (0 KB-4 KB): dirty & valid
Cache Unit 2 276 (4 KB-8 KB): dirty & valid
Cache Unit 3 278 (8 KB-12 KB): dirty & valid
Cache Unit 4 280 (12 KB-16 KB): dirty & valid Cache management process 10 may flush each of the one or more dirty cache units (e.g., cache units 274, 276, 278, 280) to the file system blocks (e.g., file system blocks 130, 132).

In some implementations, it may be observed that the life of underlying flash devices within storage system 12 may be extended. In some implementations, cache writes may not always end up as full file system block-sized writes (e.g., a cache write smaller than an 8 KB file system block). Cache management process 10 may refactor the one or more cache pages (e.g., cache pages 126, 128) into one or more smaller cache units (e.g., cache units 274, 276, 278, 280) and may generate one or more bitmaps (e.g., second bitmap 286) to indicate which cache units of the one or more cache units are dirty and need to be flushed. Cache management process 10 may refactor the one or more entries of the commit list and may flush the dirty cache units instead of flushing the entire cache page based upon, at least in part, the bitmap (e.g., second bitmap 286). Accordingly, the life of the underlying flash devices may be extended with fewer flushes and/or smaller flushes of data.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    identifying, at the computing device, one or more cache pages in a cache system;
    refactoring the one or more cache pages into one or more cache units within each of the one or more cache pages based upon, at least in part, an alignment pattern of a plurality of parallel IO requests relative to a length of the one or more cache pages, wherein the alignment pattern of the plurality of parallel IO requests is defined by the plurality of parallel IO requests having an offset and a length that are each a multiple of an alignment length, wherein refactoring the one or more cache pages into one or more cache units within the one or more cache pages includes defining the one or more cache units as portions within each of the one or more cache pages with the alignment length, wherein refactoring the one or more cache pages includes generating one or more bitmaps for the one or cache pages, wherein one or more bits in the one or more bitmaps represent the one or more cache units within the one or more cache pages and wherein the number of bits in the one or more bitmaps is based upon, at least in part, the length of the one or more cache units; and
    executing the plurality of parallel IO requests on the one or more cache units within the one or more cache pages.

2. The computer implemented method of claim 1, wherein executing the plurality of parallel IO requests includes:
    locking at least one cache unit of the one or more cache units within the one or more cache pages during execution of the plurality of parallel IO requests on the at least one cache unit.

3. The computer-implemented method of claim 1, wherein the one or more bits in the one or more bitmaps indicate which cache units within the one or more cache pages are valid.

4. The computer-implemented method of claim 1, wherein the one or more bits in the one or more bitmaps indicate which cache units within the one or more cache pages are dirty.

5. The computer-implemented method of claim 4, further comprising:
    flushing one or more dirty cache units of the one or more cache units within the one of more cache pages based upon, at least in part, the one or more bits in the one or more bitmaps which indicate which cache units within the one or more cache pages are dirty.

6. A computer program product residing on a non-transitory computer readable medium having a plurality of instructions stored thereon which, when executed by a processor, cause the processor to perform operations comprising:
    identifying one or more cache pages in a cache system;
    refactoring the one or more cache pages into one or more cache units within each of the one or more cache pages based upon, at least in part, an alignment pattern of a plurality of parallel IO requests relative to a length of the one or more cache pages wherein the alignment pattern of the plurality of parallel IO requests is defined by the plurality of parallel IO requests having an offset and a length that are each a multiple of an alignment length, wherein refactoring the one or more cache pages into one or more cache units within the one or more cache pages includes defining the one or more cache units as portions within each of the one or more cache pages with the alignment length, wherein refactoring the one or more cache pages includes generating one or more bitmaps for the one or cache pages, wherein one or more bits in the one or more bitmaps represent the one or more cache units within the one or more cache pages and wherein the number of bits in the one or more bitmaps is based upon, at least in part, the length of the one or more cache units; and
    executing the plurality of parallel IO requests on the one or more cache units within the one or more cache pages.

7. The computer program product of claim 6, wherein executing the plurality of parallel IO requests includes:
    locking at least one cache unit of the one or more cache units within the one or more cache pages during execution of the plurality of parallel IO requests on the at least one cache unit.

8. The computer program product of claim 6, wherein the one or more bits in the one or more bitmaps indicate which cache units within the one or more cache pages are valid.

9. The computer program product of claim 6, wherein the one or more bits in the one or more bitmaps indicate which cache units within the one or more cache pages are dirty.

10. The computer program product of claim 9, further comprising instructions for:
   flushing one or more dirty cache units of the one or more cache units within the one of more cache pages based upon, at least in part, the one or more bits in the one or more bitmaps which indicate which cache units within the one or more cache pages are dirty.

11. A computing system including a processor and memory configured to perform operations comprising:
   identifying one or more cache pages in a cache system;
   refactoring the one or more cache pages into one or more cache units within each of the one or more cache pages based upon, at least in part, an alignment pattern of a plurality of parallel IO requests relative to a length of the one or more cache pages wherein the alignment pattern of the plurality of parallel IO requests is defined by the plurality of parallel IO requests having an offset and a length that are each a multiple of an alignment length, wherein refactoring the one or more cache pages into one or more cache units within the one or more cache pages includes defining the one or more cache units as portions within each of the one or more cache pages with the alignment length, wherein refactoring the one or more cache pages includes generating one or more bitmaps for the one or cache pages, wherein one or more bits in the one or more bitmaps represent the one or more cache units within the one or more cache pages and wherein the number of bits in the one or more bitmaps is based upon, at least in part, the length of the one or more cache units; and
   executing the plurality of parallel IO requests on the one or more cache units within the one or more cache pages.

12. The computing system of claim 11, wherein executing the plurality of parallel IO requests includes:
   locking at least one cache unit of the one or more cache units within the one or more cache pages during execution of the plurality of parallel IO requests on the at least one cache unit.

13. The computing system of claim 11, wherein the one or more bits in the one or more bitmaps indicate which cache units within the one or more cache pages are dirty.

14. The computing system of claim 13, further configured to perform operations comprising:
   flushing one or more dirty cache units of the one or more cache units within the one of more cache pages based upon, at least in part, the one or more bits in the one or more bitmaps which indicate which cache units within the one or more cache pages are dirty.

* * * * *